US010814895B2

(12) United States Patent
Burkhardt

(10) Patent No.: US 10,814,895 B2
(45) Date of Patent: Oct. 27, 2020

(54) METHOD AND DEVICE FOR DISPLAYING A COURSE OF A PROCESS OF AT LEAST ONE RAILWAY SAFETY UNIT, AND RAILWAY SAFETY SYSTEM HAVING SUCH A DEVICE

(71) Applicant: SIEMENS MOBILITY GMBH, Munich (DE)

(72) Inventor: Marc Burkhardt, Braunschweig (DE)

(73) Assignee: Siemens Mobility GmbH, Munich (DE)

( * ) Notice: Subject to any disclaimer, the term of this patent is extended or adjusted under 35 U.S.C. 154(b) by 320 days.

(21) Appl. No.: 15/570,157

(22) PCT Filed: Apr. 1, 2016

(86) PCT No.: PCT/EP2016/057179
§ 371 (c)(1),
(2) Date: Oct. 27, 2017

(87) PCT Pub. No.: WO2016/177518
PCT Pub. Date: Nov. 10, 2016

(65) Prior Publication Data
US 2018/0141575 A1    May 24, 2018

(30) Foreign Application Priority Data
May 5, 2015    (DE) .......................... 10 2015 208 273

(51) Int. Cl.
*B61L 25/06*    (2006.01)
*B61L 1/20*    (2006.01)
(Continued)

(52) U.S. Cl.
CPC ................. *B61L 25/06* (2013.01); *B61L 1/20* (2013.01); *B61L 21/06* (2013.01);
(Continued)

(58) Field of Classification Search
CPC . B61L 1/20; B61L 25/06; B61L 25/08; G02B 27/22; G06F 3/14; G09G 3/00; G09G 3/006; G09G 2330/08
See application file for complete search history.

(56) References Cited

U.S. PATENT DOCUMENTS 7,999,848 B2 * 8/2011 Chew .................... B61L 23/041
348/143
8,786,705 B2 * 7/2014 Kister ....................... B61B 1/02
348/148
(Continued)

FOREIGN PATENT DOCUMENTS

BE          888920 A     11/1981
CN       101964168 A      2/2011
(Continued)

OTHER PUBLICATIONS

Wikipedia: "Head-mounted display"; from Wikipedia, the free encyclopedia; is an old revision of this page, as edited 62.111.218.66 (talk) at 12:44; Mar. 25, 2015; https://en.wikipedia.org/wiki/Head-mounted_display; 2015.

*Primary Examiner* — Jason C Smith
(74) *Attorney, Agent, or Firm* — Laurence Greenberg; Werner Stemer; Ralph Locher

(57) ABSTRACT

A method displays a course of a process of at least one railway safety unit. While using at least one device control, process data supplied by the at least one railway safety unit, are converted by dual-channel processing into first and second image data of the course of the process to be displayed. The image data are output to be displayed on a data display unit. In order to simplify the displaying of the course of the process, a pair of display spectacles having a first and a second display is used as a data display unit. The first display displays a first representation of the first image data delivered thereto that is visually detectable by the right (Continued)

Figure 1:
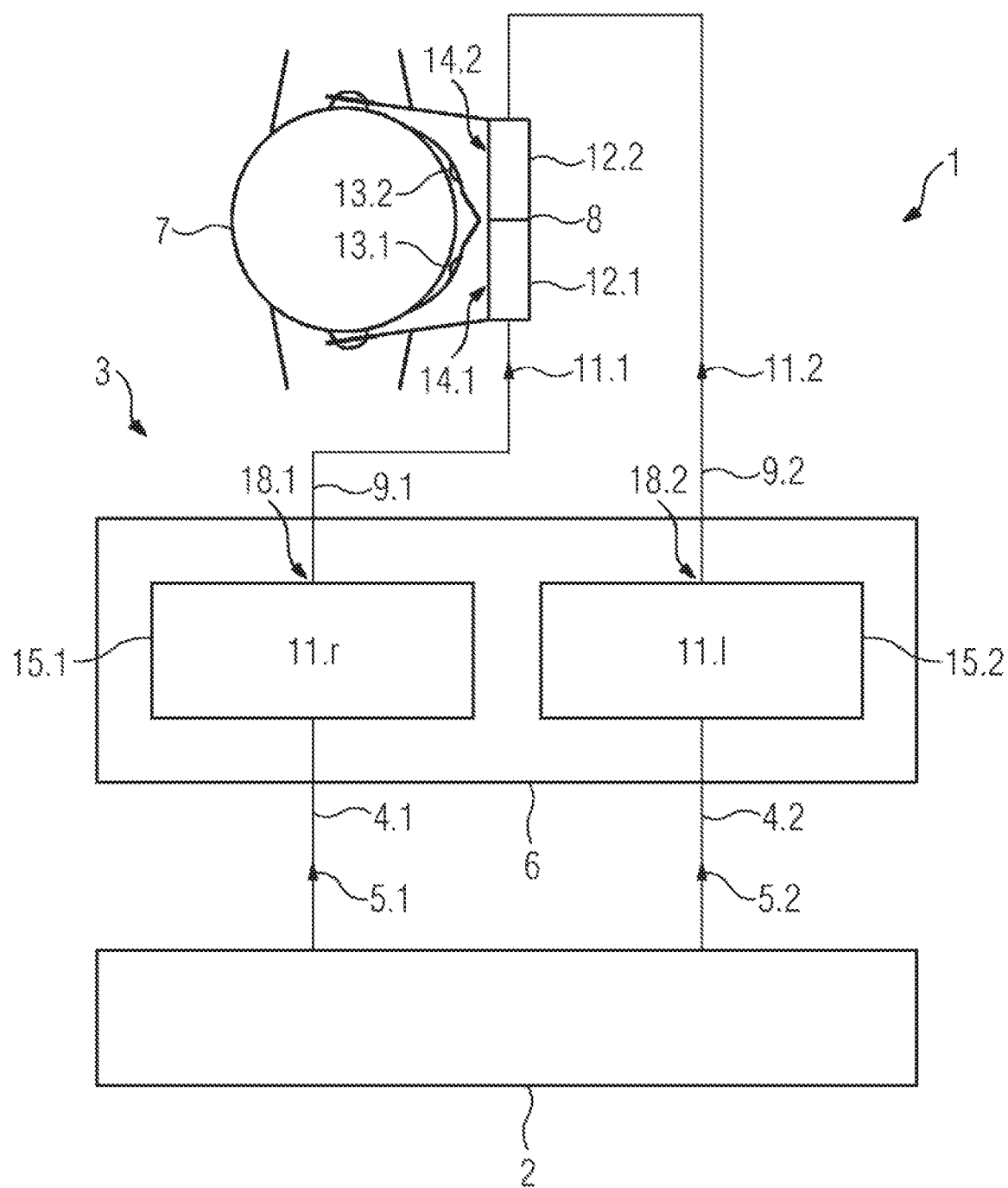

eye, and the second display displays a second representation of the second image data delivered thereto that is visually detectable by the left eye.

5 Claims, 2 Drawing Sheets

(51) Int. Cl.
  *B61L 21/06* (2006.01)
  *B61L 27/00* (2006.01)
  *G02B 27/01* (2006.01)
  *G06F 11/14* (2006.01)
  *G09G 3/00* (2006.01)
  *G06F 3/14* (2006.01)
  *G06F 11/16* (2006.01)
  *H04N 21/472* (2011.01)

(52) U.S. Cl.
  CPC ....... *B61L 27/0061* (2013.01); *B61L 27/0072* (2013.01); *B61L 27/0088* (2013.01); *G02B 27/0172* (2013.01); *G06F 11/14* (2013.01); *G02B 2027/0134* (2013.01); *G06F 3/14* (2013.01); *G06F 11/162* (2013.01); *G09G 3/006* (2013.01); *G09G 2330/08* (2013.01); *H04N 21/472* (2013.01)

(56) References Cited

U.S. PATENT DOCUMENTS

| | | | | |
|---|---|---|---|---|
| 8,836,775 | B2* | 9/2014 | Baek | H04N 13/161 348/58 |
| 2004/0061777 | A1* | 4/2004 | Sadok | G08B 17/125 348/83 |
| 2007/0013776 | A1* | 1/2007 | Venetianer | H04N 7/181 348/143 |
| 2009/0289968 | A1* | 11/2009 | Yoshida | G09G 3/2081 345/691 |
| 2010/0070172 | A1* | 3/2010 | Kumar | B61L 23/041 701/408 |
| 2011/0063452 | A1* | 3/2011 | Fifis | G06F 3/14 348/180 |
| 2011/0193846 | A1* | 8/2011 | Kimura | H01L 29/7869 345/211 |
| 2013/0314139 | A1* | 11/2013 | Umezaki | G02F 1/13624 327/208 |
| 2014/0240617 | A1* | 8/2014 | Fukutome | G02F 1/136209 349/12 |
| 2015/0201165 | A1* | 7/2015 | Bocionek | B61L 23/04 348/148 |
| 2019/0161103 | A1* | 5/2019 | Venkatasubramanian | B61L 27/0083 |

FOREIGN PATENT DOCUMENTS

| | | |
|---|---|---|
| CN | 102316349 A | 1/2012 |
| CN | 102316349 B | 2/2014 |
| CN | 103781692 A | 5/2014 |
| DE | 2536045 A1 | 2/1977 |
| DE | 3019713 A1 | 2/1982 |
| DE | 3324313 A1 | 1/1985 |
| DE | 4332143 A1 | 3/1995 |
| DE | 10330115 A1 | 2/2005 |
| DE | 102010017857 A1 | 10/2011 |
| DE | 102012217291 A1 | 3/2014 |
| EP | 0448134 A2 | 9/1991 |
| EP | 1739556 A1 | 1/2007 |
| JP | 3447968 B2 | 9/2003 |
| WO | 2013026761 A1 | 2/2013 |

* cited by examiner

METHOD AND DEVICE FOR DISPLAYING A COURSE OF A PROCESS OF AT LEAST ONE RAILWAY SAFETY UNIT, AND RAILWAY SAFETY SYSTEM HAVING SUCH A DEVICE

BACKGROUND OF THE INVENTION

Field of the Invention

The redundancy computer principle having a fail-safe computer as a comparator is currently an established method if a safe display is required for an operating and display system for electronic signal boxes or for relay signal boxes having remote control within the meaning of CENELEC standard 50129 SIL 4.

A method of this kind is known, for example, from German patent application DE 43 32 143 A1. Here, process data supplied by at least one railway safety unit (points, signal, crossing, etc.) is converted using two computers, which are not fail-safe (operator station computer and reference computer) by means of dual-channel processing into first and second image data of the course of the process to be displayed. The operator station computer and the reference computer therefore form processing channels in which the supplied process data—in other words, the same original data—is converted independently of each other into the first and second image data of the course of the process to be displayed, with only the first image data being output for display on a data display unit, however. In order to check whether the first image data output for display has not been falsified, separate test data reduced from the data volume is formed by way of the first and second image data according to a mathematical or other imaging method that is known per se. The test data is then checked by means of the comparator for content matching, with any deviations indicating the presence of a fault. In the case of the safety-critical operating and display system, the content of the image memory connected downstream of the graphics system is therefore read out, a signature is formed and compared in the safe computer with a signature formed in the same way by a reference computer. Screen buffer errors or computing errors due to memory errors, which would lead to misrepresentation, should be revealed thereby.

The invention relates to a method for displaying a course of a process of at least one railway safety unit, wherein while using at least one device control, process data supplied by the at least one railway safety unit is converted by means of dual-channel processing into first and second image data of the course of the process to be displayed, and is output to be displayed on a data display unit.

A method of this kind is known, for example, from the introduction to the description of German patent application acknowledged above, DE 43 32 143 A1. In this known method, dual-channel processing occurs by means of two device controls that are completely independent of each other, and the first and second image data is alternately connected to the one data display unit. The changeover frequency is about 1 Hz. As long as the two device controls deliver matching image data to the data display unit, designated therein as a display device, the observer is given a stationary image. This is an indication of the image data and its displayed representation corresponding with the course of the process. If the image data output on the data display unit differs from each other, however, the representation, or parts of the representation, of the image data flash in rhythm with the changeover frequency.

This informs an observer that the imparted image of the course of the process does not match the actual course of the process. As a consequence of this he must henceforth no longer output safety-critical commands whose reliability is no longer being checked by a signal box. Additional indicators are required here to indicate to the user that the representation is actually being alternately fed from a the two device controls and does not emanate, for instance due to an error, from just one of the device controls.

SUMMARY OF THE INVENTION

Taking this as a starting point, the invention is based on the object of simplifying displaying of the course of a process.

This object is achieved by a method, wherein a pair of display goggles having a first and a second display is used as a data display unit, wherein the first display displays a first representation of the first image data delivered thereto that is visually detectable by the right eye, and wherein the second display displays a second representation of the second image data delivered thereto that is visually detectable by the left eye.

The observer can now advantageously determine without additional indicators whether both the representation of the first image data and the representation of the second image data is being displayed for him. As a result of his capacity for sensory binocular vision, in particular for stereoscopic vision, the observer is also capable of determining whether the representations being displayed for him are identical.

Use of the display goggles having a first and a second display as the data display unit therefore offers the option of using the observer as a safe comparator because the first and second image data is firstly generated in different ways—namely in a dual-channel manner, in other words using two independent processing channels of the at least one device control, and then supplied to the display goggles and displayed by these in the form of two redundant representations. Since the observer can visually perceive the two redundant representations simultaneously, he can a identify errors, which are produced during the conversion of the process data into image data, but also errors which are produced only when the image data is displayed.

Display goggles having a first and a second display are taken to mean, in particular, a visual data display unit secured to the head, "HMD" (Head-Mounted Display) which presents the representations of the first and second image data either on two near-to-eye screens or projects them directly onto the retinas of the two eyes of the observer (the user of the display goggles).

The principle of the inventive safe display therefore lies in display goggles being used in which a right-hand and a left-hand image of the course of the process to be displayed are generated separately for the right and left eyes, wherein the observer's (the user of the display goggles) capacity for binocular vision, in particular for stereoscopic vision, is used for reliable comparison.

Where with the conventional method known from document DE 43 32 143 A1 the observer remains outside in the case of error detection and only one image is displayed for him on just one screen (right and left eyes see the same screen), with the inventive method the binocular, in particular stereoscopic, capacities of the user can be incorporated by the use of the display goggles fitted with two data display units. The user of the display goggles checks the visual matching of two different displays in that representations of the display data that have each been generated in different ways—in other words, displays—having the alleged same content are displayed for the right and left eyes. If there is a display error in one of the two representations, then there is no overlapping of the same a information in the binocular, in particular stereoscopic, view, so the user can identify the error.

For this purpose, the representations to be displayed of the first and second image data, which correspond to images of the course of the process, are calculated twice and delivered by two communications channels to the two different data display units. Display errors of the hardware can therefore be revealed by the redundant construction of the displays. The redundant processing channels can be designed in the form of an arithmetic unit or on two device controls in the form of two arithmetic units (for example "operator station computer" and "reference computer"). The first and second image data can therefore be calculated on one arithmetic unit or on two separate arithmetic units.

A second arithmetic unit ("reference computer") as well as a safe comparator can thereby be omitted with the inventive method. This reduces the complexity of the system significantly.

It is regarded as advantageous if the supplied process data is converted in sections of the dual-channel processing into right-hand and left-hand image data which correspond to images of the course of the process generated from the same perspective for monoscopic examination.

The right-hand image data can then be output as the first image data and the left-hand image data can be output as the second image data. The observer can then perceive the two images of the course of the process at least simultaneously (first stage of sensory binocular vision), but, as a rule, merged to form a single image (second stage of sensor binocular vision).

Alternatively, the right-hand and the left-hand image data can be converted in further sections of the dual-channel processing into further right-hand and left-hand image data which correspond to images of the course of the process generated from different perspectives for stereoscopic examination.

The further right-hand image data can then be output as the first image data and the further left-hand image data can be output as the second image data. The observer can then perceive the two images of the course of the process merged to form a single image (third stage of sensory binocular vision).

The inventive method can therefore also immediately be used for fitting three-dimensional user interfaces in a virtual or expanded reality with a safe display because even if the first and second image data to be displayed, which corresponds to two separate images of the course of the process, is calculated offset in perspective for the stereoscopic effect, errors which are produced during the conversion of the process data into the image data, but also errors which are only produced when the image data is displayed, immediately come to light in the stereoscopic view as well—in other words with the merging of the two images to form a single spatial image.

The invention also relates to a device for displaying a course of a process of at least one railway safety unit having at least one device control and having a data display unit, wherein the at least one device control is suitably designed for converting process data supplied by the at least one railway safety unit by means of dual-channel processing into first and second image data of the course of the process to be displayed and for outputting this for display on the data display unit.

The invention is based on the object of improving a device known from the introduction to the description of the German patent application acknowledged above, DE 43 32 143 A1, such that it enables simplified displaying of the course of the process.

To achieve this object, with an arrangement of this kind the data display device is a pair of display goggles having a first and a second display, wherein the first display is suitably designed for displaying a first representation of the first image data delivered thereto that is visually detectable by the right eye and wherein the second display is suitably designed for displaying a second representation of the second image data delivered thereto that is visually detectable by the left eye.

The inventive arrangement logically has the same advantages as have already been disclosed above in conjunction with the description of the inventive method.

In addition, the invention relates to a railway safety system having a device of this kind.

BRIEF DESCRIPTION OF THE SEVERAL
VIEWS OF THE DRAWING

Figure 2:
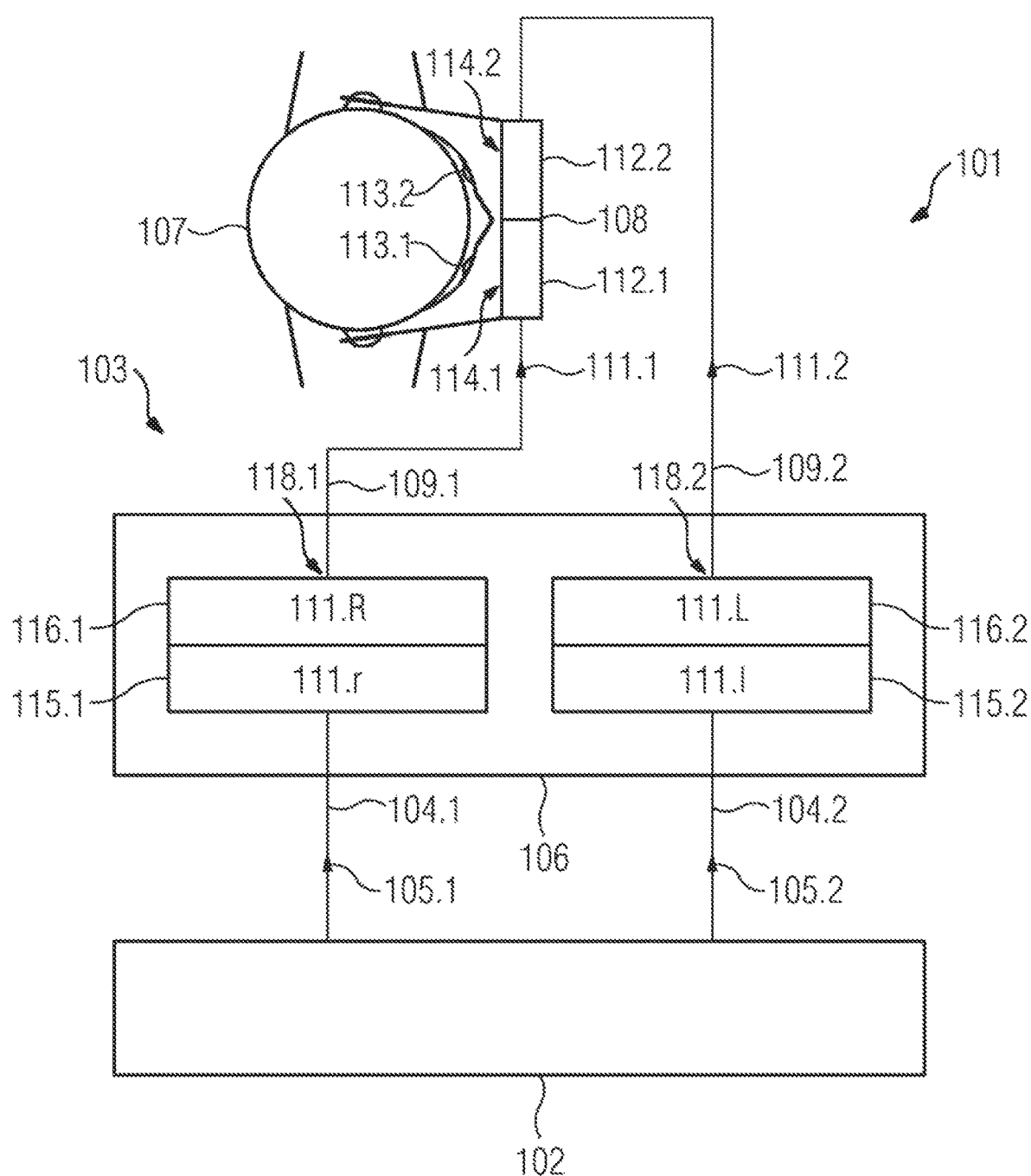

The invention will be illustrated in more detail below with reference to the figures, in which:

FIG. 1 shows a schematic diagram of a railway safety system having a first embodiment of the inventive device for displaying a course of a process of at least one railway safety unit and FIG. 2 shows a schematic diagram of a further inventive railway safety system having a second embodiment of the inventive device for displaying a course of a process of at a least one railway safety unit.

DESCRIPTION OF THE INVENTION

The railway safety system 1; 101 shown in FIGS. 1 and 2 has at least one railway safety unit 2; 102, a device 3; 103 for displaying a course of a process of the at least one railway safety unit 1; 101 and separate data transfer channels 4.1, 4.2; 104.1, 104.2. The at least one railway safety unit 1; 101, which can be points, a signal, a crossing, etc., of a signal box or a train control system, is suitably designed for outputting process data 5.1, 5.2; 105.1, 105.2, corresponding to its course of the process, via the separate data transfer channels 4.1, 4.2; 104.1, 104.2, to the device 3; 103. The device 3; 103 for displaying the course of the process is suitably designed for displaying the course of the process of the at least one railway safety unit 1; 101 using the supplied process data 5.11, 5.2; 105.1, 105.2.

For this purpose, the device 3; 103 has a data display unit 8, 108 worn by a user 7; 107 (observer, for example dispatcher) on his head, and separate further data transfer channels 9.1, 9.2; 109.1, 109.2 for displaying the course of the process a device control 6; 106.

The at least one device control 6; 106 is suitably designed for converting the process data 5.1, 5.2; 105.1, 105.2 supplied by the at least one railway safety unit 1; 101 by means of dual-channel processing into first and second image data 11.1, 11.2; 111.1, 111.2 in the form of video data of the course of the process to be displayed, and for outputting for display on the data display unit 8; 108.

The data display unit 8; 108 is a pair of display goggles in the form of a Head-Mounted Display (HMD for short) having two separate displays 12.1, 12.2; 112.1, 112.2 in a the form of two separate screens. A first 12.1; 112.1 of the two displays is suitably designed for displaying a first representation 14.1; 114.1 of the first image data 11.1; 111.1 delivered thereto that is visually detectable by the right eye 13.1.

The second 12.2; 112.2 of the two displays is suitably designed for displaying a second representation 14.2; 114.2 of the second image data 11.2; 111.2 delivered thereto that is visually detectable by the left eye 13.2; 113.2.

The at least one device control 6; 106 is suitably designed for converting the supplied process data 5.1, 5.2; 105.1, 105.2 in sections 15.1, 15.2; 115.1, 115.2 of the dual-channel processing into right-hand and left-hand image data which correspond to images of the course of the process generated from the same perspective for monoscopic examination.

In the first embodiment of the device 3, shown in FIG. 1, for displaying the course of a process, the device control 6 is suitably designed for outputting the right-hand image data as first image data and the left-hand image data as second image data 11.1, 11.2 on the display goggles 8.

In contrast to this, the device control 106 in the second embodiment, shown in FIG. 2, of the device 103 for displaying the course of the process is suitably designed for converting the right-hand and left-hand image data in further sections 116.1, 116.2 of the processing into further right-hand and left-hand image data which correspond to images of the course of the process generated from different perspectives for stereoscopic examination. In contrast to the device control 6 shown in FIG. 1, the device control 106 shown in FIG. 2 is suitably designed for outputting further right-hand image data as the first image data 112.1 and the further left-hand image data as the second image data 112.2 on the display goggles.

The inventive method is accordingly carried out as follows.

By way of the separate data transfer channels 4.1, 4.2; 104.1, 104.2, the at least one railway safety unit 2; 102 supplies, preferably continuously in each case, the same process data 5.1, 5.2; 105.1, 105.2 to the device 3; 103 for displaying the course of the process.

This process data 3; 103 supplied by the at least one railway safety unit is processed using the at least one device control 6; 106, designed as an arithmetic unit, on dual channels, in other words, by means of two separate processing channels 18.1, 18.2; 118.1, 118.2 of the device control. The supplied process data 5.1, 5.2; 105.1, 105.2 is converted in the sections 15.1, 15.2; 115.1, 115.2 of the dual-channel processing into the right-hand and left-hand image data 11.*r*, 11.*l*; 111.*r*, 111.*l* in the form of video data which corresponds to images of the course of the process generated from the same perspective for monoscopic examination. The supplied process data 5.1; 105.1 is therefore converted in section 15.1; 115.1 by the first processing channel 18.1; 118.1 into the right-hand image data 11.*r*; 111.*r*. And the process data 5.2; 105.2, which resembles the process data 5.1; 105.1, is converted in section 15.2; 115.2 by the second processing channel 18.2; 118.2 into the left-hand image data 11.*l*; 111.*l*.

In the first embodiment of the device 3, shown in FIG. 1, the right-hand image data 11.*r* is then output as the first image data 11.1 and the left-hand image data 11.*l* is output as the second image data 11.2 via the further separate data transfer channels 9.1, 9.2 to the display goggles used as a data display unit 8.

The first display 12.1 of the display goggles 8 then shows a first representation 14.1 of the first image data 11.1 delivered thereto as video data that is visually detectable by the right eye 13.1, and the second display 12.2 of the display goggles 8 displays a second representation 14.2 of the second image data 11.2 delivered thereto as video data that is visually detectable by the left eye 13.2.

The observer 7 wearing the display goggles 8 perceives the two displayed representations 14.1, 14.2 of the image data 11.1, 11.2—in other words, the two images of the course of the process—at least simultaneously, but, as a rule, merged to form a single image.

In the second embodiment 103 of the device shown in FIG. 2, the right-hand and left-hand image data 111.*r*, 111.*l* is converted in the further sections 116.1, 116.2 of the dual-channel processing into the further right-hand and left-hand image data 111.R, 111.L which correspond to images of the course of the process generated from different perspectives for stereoscopic examination. The right-hand image data 111.*r* is therefore converted in the further section 116.1 by the first processing channel 118.1 into the further right-hand image data 111.R. And the left-hand image data 111.*l* is converted in the section 116.2 by the second processing channel 118.2 into the further left-hand image data 111.L.

The further right-hand image data 111.R is then output as the first image data 111.*l* and the further left-hand image data 111.L is output as the second image data 111.2 on the display goggles.

Here too the first display 112.1 of the display goggles 108 accordingly displays a first representation 114.1 of the first image data 111.*l* delivered thereto as video data that is visually detectable by the right eye 113.1, and the second display 112.2 of the display goggles 108 displays a second representation 114.2 of the second image data 111.2 delivered thereto as video data that is visually detectable by the left eye 113.2.

The observer 107 wearing the display goggles 108 perceives the two displayed representations 114.1, 114.2 of the image data 111.*l*, 111.2—in other words, the two images of the course of the process—at least simultaneously here as well, but, as a rule, merged to form a single spatial image.

The user 7; 107 of the display goggles 8; 108 checks the visual matching of the two redundant representations 14.1, 14.2; 114.1, 114.2. For this purpose, he checks whether the visual information of the two displayed, supposedly identical images of the course of the process actually overlap. In the case of an error during conversion of the process data 5.1, 5.2; 105.1, 105.2 into the image data 11.1, 11.2; 111.*l*, 111.2 or in the case of an error in the representation of the image data 11.1, 11.2; 111.*l*, 111.2, there is no overlap of the visual information in the binocular, in particular stereoscopic, view, so the observer 7; 107 can identify the error.

The invention claimed is:

1. A method for displaying a course of a process of at least one railway safety unit, which comprises the steps of:
    converting, via at least one device control, process data supplied by the at least one railway safety unit by means of dual-channel processing into first and second image data of the course of the process to be displayed;
    outputting the first and second image data to be displayed on a data display unit; and
    providing a pair of display goggles having a first and a second display as the data display unit, the first display displaying a first representation of the first image data delivered thereto that is visually detectable by a right eye, and the second display displaying a second representation of the second image data delivered thereto that is visually detectable by a left eye.

2. The method according to claim 1, which further comprises converting the process data in sections of the dual-channel processing into right-hand image data and left-hand image data which correspond to images of the course of the process generated from a same perspective for monoscopic examination.

3. The method according to claim 2, which further comprises:
   outputting the right-hand image data as the first image data to the display goggles; and
   outputting the left-hand image data as the second image data to the display goggles.

4. The method according to claim 2, which further comprises converting the right-hand image data and the left-hand image data in further sections of the dual-channel processing into further right-hand image data and further left-hand image data which correspond to image data of the course of the process generated from different perspectives for stereoscopic examination.

5. The method according to claim 4, which further comprises:
   outputting the further right-hand image data as the first imaged data to the display goggles; and
   outputting the further left-hand image data as the second image data to the display goggles.

* * * * *